US011980581B2

(12) United States Patent
Grant

(10) Patent No.: US 11,980,581 B2
(45) Date of Patent: May 14, 2024

(54) PERSONAL LIFTING APPARATUS

(71) Applicant: Mark Grant, Palm Bay, FL (US)

(72) Inventor: Mark Grant, Palm Bay, FL (US)

( * ) Notice: Subject to any disclaimer, the term of this patent is extended or adjusted under 35 U.S.C. 154(b) by 0 days.

(21) Appl. No.: 18/367,552

(22) Filed: Sep. 13, 2023

(65) Prior Publication Data

US 2023/0414426 A1 Dec. 28, 2023

(51) Int. Cl.
*A61G 7/10* (2006.01)

(52) U.S. Cl.
CPC .......... *A61G 7/1011* (2013.01); *A61G 7/1019* (2013.01); *A61G 7/109* (2013.01)

(58) Field of Classification Search
CPC ..... A61G 7/1011; A61G 7/1019; A61G 7/109
USPC .......................................................... 297/344.12
See application file for complete search history.

(56) References Cited

U.S. PATENT DOCUMENTS 5,333,333 A * 8/1994 Mah .......................... A61H 3/04 280/30
6,941,595 B1 * 9/2005 Michael ............... A61G 7/1019 5/83.1
7,611,203 B1 * 11/2009 Roberts ................ A61G 7/1059 297/217.7
9,254,233 B2 * 2/2016 Schy .................... A61G 7/1059

* cited by examiner

*Primary Examiner* — Mark R Wendell
(74) *Attorney, Agent, or Firm* — Bullock Law; Stephen Bullock

(57) ABSTRACT

Embodiments of the present invention are related to a personal lifting apparatus including an outer frame with a pair of opposing sides, each side including an upper handle, outer vertical support, and a foundation bar. There is an upper crossbar and a lower crossbar extending from one side and connecting to the opposing side. A motor assembly is situated atop the upper crossbar and a threaded rod extends from the upper crossbar to the lower crossbar. An inner frame includes a pair of tracks attached thereto, a seat assembly attached to the pair of tracks and a threaded slide coupler fixedly attached to the seat assembly. The seat is pliable material. The seat assembly is structured to ascend and descend within the outer frame via the slide coupler. It is structured to align with the floor in a first position and lift a seated user to a second position.

20 Claims, 14 Drawing Sheets

PERSONAL LIFTING APPARATUS

FIELD OF THE INVENTION

The present invention relates to systems and methods for lifting elderly persons that have fallen. In particular, the present invention relates to an automated personal lifting apparatus and associated methods.

BACKGROUND

Elderly persons that fall oftentimes do not have an effective means to reestablish themselves to a standing position on their own. Furthermore, they are often assisted by their partners, which more often than not are also elderly and lack sufficient strength to lift them to their feet. In fact, because of the difficult weight distribution of a fallen individual as well as their fragility, even younger more able persons have difficulty raising a fallen person to their feet.

Therefore, there exists a need for an automated lifting system to safely and securely lift a fallen and compromised person to their feet with minimal effort. There exists a need for a personal lifting apparatus and associated methods.

SUMMARY OF THE INVENTION

Embodiments of the present invention are related to a personal lifting apparatus including an outer frame with a pair of opposing sides, each side including an upper handle, outer vertical support, and a foundation bar. There may be an upper crossbar and a lower crossbar extending from one side and connecting to the opposing side. A motor assembly may be situated atop the upper crossbar and a threaded rod may extend from the upper crossbar to the lower crossbar. An inner frame may include a pair of tracks attached thereto, a seat assembly attached to the pair of tracks and a threaded slide coupler fixedly attached to the seat assembly. The seat may be pliable material. The seat assembly may be structured to ascend and descend within the outer frame via the slide coupler. It may be structured to align with the floor in a first position and lift a seated user to a second position.

Each foundation bar may be structured to extend distally from the outer vertical support and may include a pair of wheels proximate each opposing end. The inner frame may include a pair of inner vertical supports attached to the outer vertical supports and the pair of tracks may be attached to the inner vertical supports.

The seat assembly may include a pair of opposing side L-Braces attached to sliders positioned within the pair of tracks and the sliders may include of a pair of blocks on opposing sides of the inner frame structured to ascend and descend slider bars positioned on the sides.

The motor assembly may rotate the threaded rod causing the threaded slide coupler fixedly attached to the seat assembly to ascend and descend. The motor assembly may include a grip structured to actuate its motor when squeezed. The motor within the motor assembly may be actuated via remote. The motor assembly may connect to the threaded rod through the upper crossbar and may include a removable and rechargeable battery.

Another embodiment of the personal lifting apparatus may include a front and a back, an outer frame including a pair of opposing sides, each side with an upper handle, outer vertical support, and a foundation bar. Each foundation bar may be structured to extend distally from the outer vertical support and may include a pair of wheels proximate each opposing end. An upper crossbar and a lower crossbar may extend from one side and connect to the opposing side. A motor assembly may be situated atop the upper crossbar and a threaded rod may extend from the upper crossbar to the lower crossbar. An inner frame with a pair of inner vertical supports may be attached to the outer vertical supports and a pair of tracks may be attached to the pair of inner vertical supports at the apparatus front. A seat assembly with a pair of opposing side L-Braces may be attached to sliders positioned within the pair of tracks and a seat back may extend from one side L-Brace vertical member to another. A threaded slide coupler may be fixedly attached to the seat back and a pliable seat may be structured to slidably engage each side L-Brace and extend from one side of the seat assembly to the other.

The seat assembly may be structured to ascend and descend via the slide coupler within the outer frame when the motor assembly rotates the threaded rod and each foundation bar may include an attachment angle extending from the outer vertical support to create a wider opening at the front.

The motor assembly may include a removable and rechargeable battery and the pliable seat may be made of at least one of fabric and synthetic fabric. The seat assembly may further include at least one of a seat belt and seat back and may be structured to rest perpendicularly when in the open position and parallel with the seat back when in the closed position.

Additionally, the foundation bars may be structured to rotate and align with at least one of the lower crossbar and outer frame for storage and the handles may be structured to rotate and align with the upper crossbar for storage. The motor assembly may include a grip structured to actuate its motor when squeezed.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
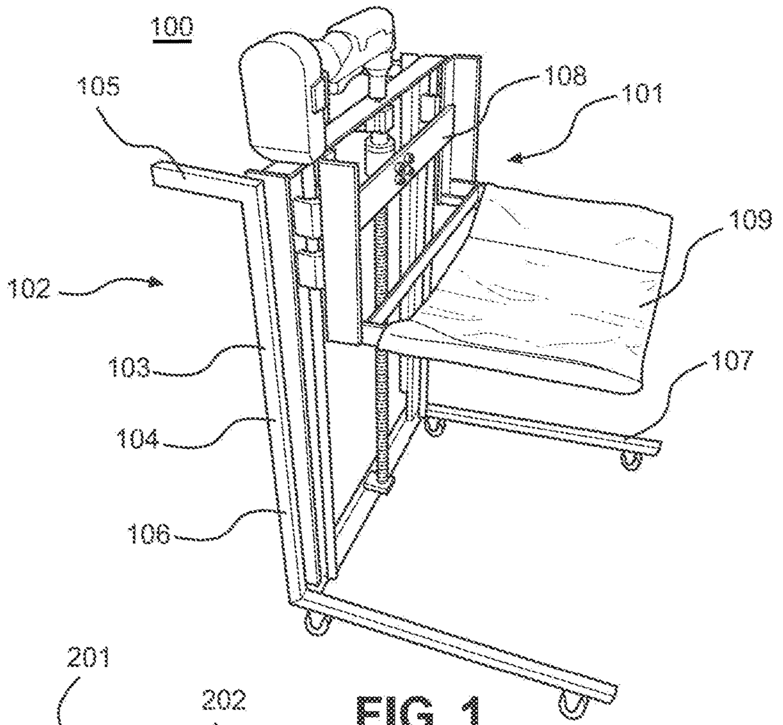
FIG. 1 is a side perspective view of a personal lifting apparatus according to an embodiment of the invention.

Referring now to FIG. 1, the personal lifting apparatus, hereinafter the apparatus 100, is shown. It may include a front 101, a back 102, and an outer frame 103 with a pair of opposing sides 104 supported by a pair of foundation bars 107. Each side 104 may include an upper handle 105 connected to an outer vertical support 106. Each outer vertical support 106 may be connected to a foundation bar 107 extending distally therefrom. Furthermore, a seat assembly 108 including a pliable seat 109 may be positioned within the outer frame 103.

Figure 2A:
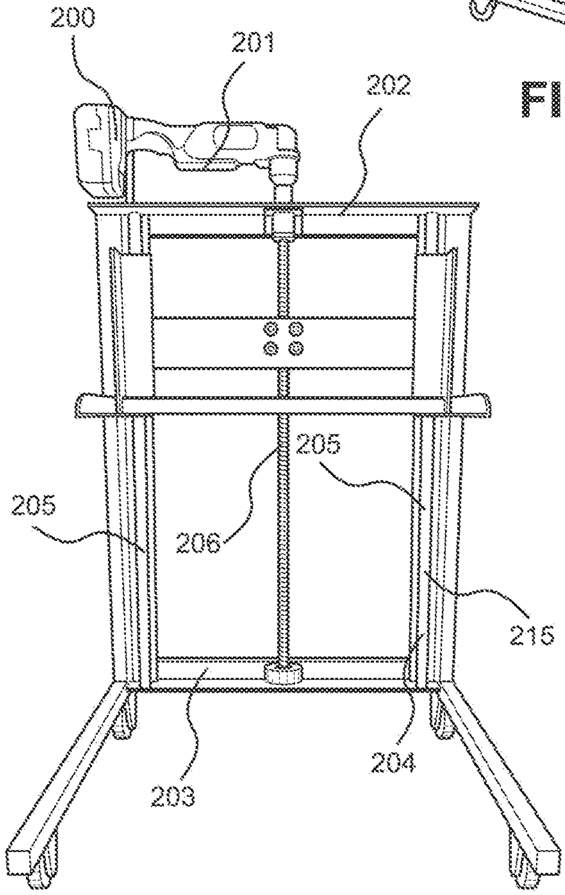
FIG. 2A is a front view of the personal lifting apparatus according to the embodiment of the invention illustrated in FIG. 1.

FIG. 2A illustrates that the outer frame 103 may also include a motor assembly 200 with an actuating grip 201 mounted on an upper crossbar 202. The upper crossbar 202 may extend from one side 104 to an opposing side 104. Likewise, a lower crossbar 203 may extend from one side 104 to an opposing side 104. Together the upper crossbar 202 and lower crossbar 203 may be the upper and lower boundaries of an inner frame 204 that may be enclosed by a pair of opposing vertical tracks 205 at the front sides of the apparatus 100. The vertical tracks 205 may be attached to a pair of inner vertical supports 215, which may be attached to the outer frame 103. Furthermore, centrally located and extending from the upper crossbar 202 to the lower crossbar 203 may be a medial threaded rod 206. Although depicted here centrally, and described as medial, one skilled in the art will appreciate that the threaded rod 206 may be positioned at any point along the upward longitudinal axis of the apparatus 100. Furthermore, in some embodiments there may be a plurality of threaded rods 206 to effectuate the same goal.

Figure 2B:
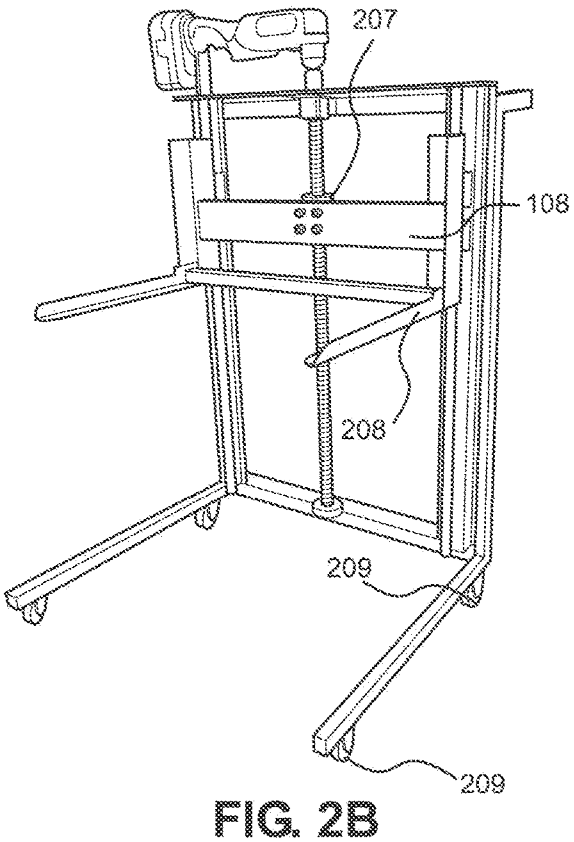
FIG. 2B is a front perspective view of the personal lifting apparatus according to the embodiment of the invention illustrated in FIG. 1.

FIG. 2B demonstrates that the medial threaded rod 206 may be connected to the seat assembly 108 via a threaded slide coupler 207. Furthermore, the seat assembly 108 may include two side L-Braces 208 and each foundation bar 107 may include a pair of wheels 209 on their respective lower surfaces at opposing ends.

Figure 3A:
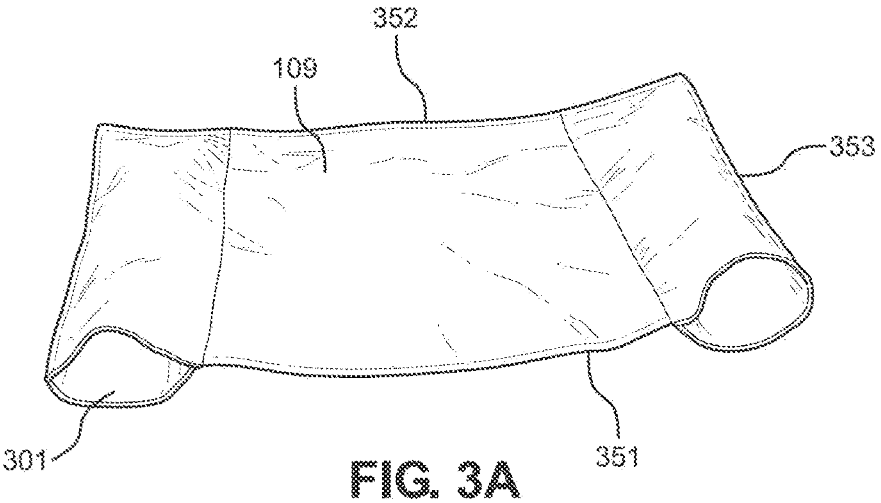
FIG. 3A is a front perspective view of componentry of the personal lifting apparatus according to the embodiment of the invention illustrated in FIG. 1.

FIG. 3A illustrates the pliable seat 109 with a pair of side sleeves 301 on each lateral end of the pliable seat 109. The side sleeves 301 may be open at a front edge 351 and closed at its back edge 352 and side edges 353 creating a pair of sleeves within the pliable seat 109. The pliable seat 109 itself may be made of fabric or synthetic fabric that is sturdy enough to support the sitting weight of a person, but also flexible. The back edge 352 and front edge 351 of the pliable seat 109 may be its longitudinal edges. The side edges 353 may be its lateral edges.

Figure 3B:
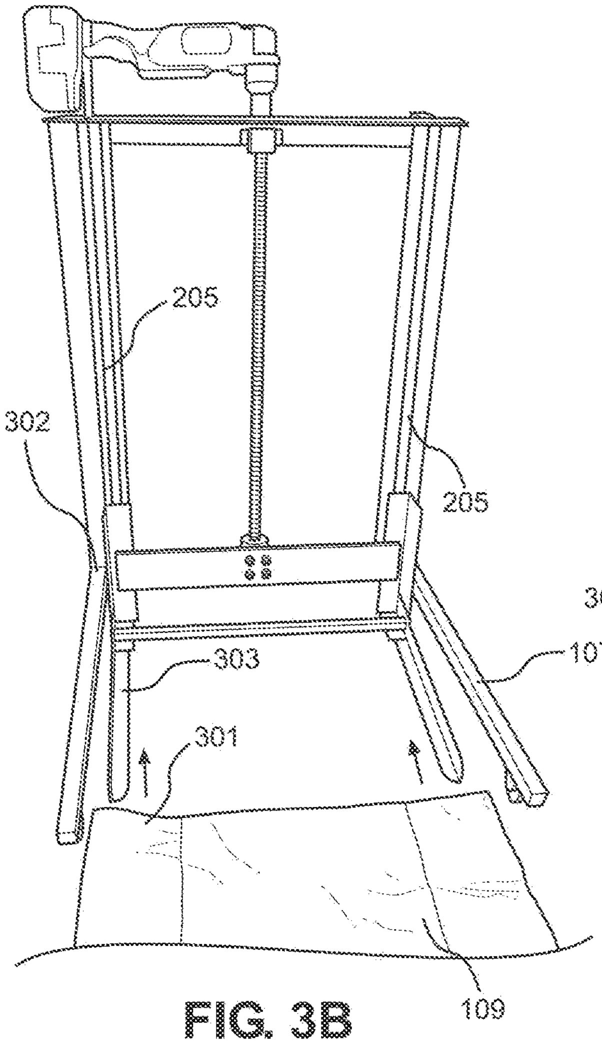
FIG. 3B is front view of componentry of the personal lifting apparatus according to the embodiment of the invention illustrated in FIG. 1.
Figure 3C:
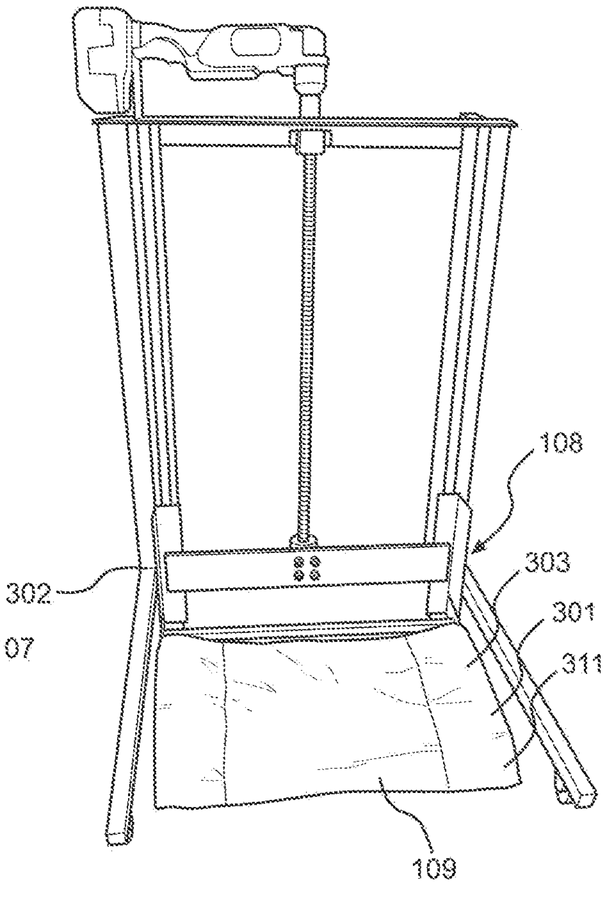
FIG. 3C is a front view of the personal lifting apparatus in a first position according to the embodiment of the invention illustrated in FIG. 1.

FIGS. 3B and 3C show how the pliable seat 109 may be fitted onto the seat assembly 108 as well as additional features of the apparatus 100. As shown, the pliable seat 109 may removably engage the seat assembly 108 whereby the side sleeves 301 are operable to slide onto and off of seat assembly side foundations 303. The seat assembly side foundations 303 may be the lower perpendicular portions of the L-Braces 208. In some embodiments, the seat assembly side foundations 303 may include a bottom portion and a side portion that may terminate into a rounded end distal to the vertical portion of the apparatus 100.

Furthermore, in these figures the seat assembly 108 is shown in a first position 311 being flush with the ground after having descended the tracks 205 of the apparatus 100. In this position, the seat assembly side foundations 303 may be situated between the foundation bars 107. The foundation bars 107 may include an attachment angle 302 at the outer frame 103 wider than the seat assembly side foundations 303, which may allow for the seat assembly side foundations 303 to sit therebetween when in the first position 311. In other words, the foundation bars 107 may create an attachment angle 302 extending from the outer vertical support 106 creating a wider opening at the apparatus front 101.

Figure 4:
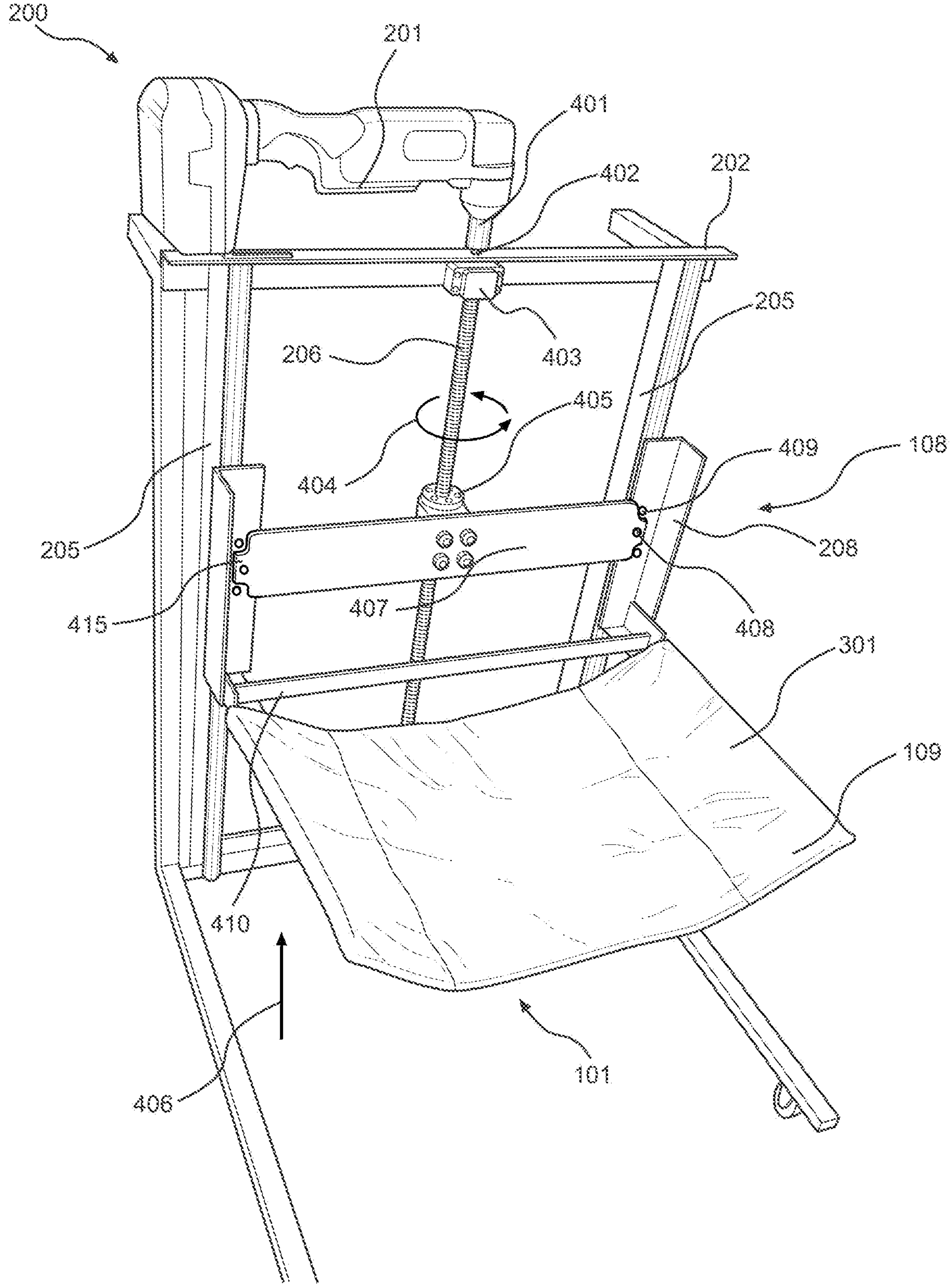
FIG. 4 is a front perspective view of the personal lifting apparatus in a transition position according to the embodiment of the invention illustrated in FIG. 1.

FIG. 4 takes a closer look at components of the apparatus 100 from the front 101. As previously described, the motor assembly 200 may include an actuating grip 201 structured to set in motion the motor and rotation of the medial threaded rod 404 when squeezed. This rotation may be effectuated by the attachment features of the motor assembly 200. More specifically, there may be an attachment member 401 and a connector 402 that permeates the upper crossbar 202 and attaches to an upper portion of the medial threaded rod 206. In some embodiments, the connector 402 may include polygonal edges that fit into an interior of the medial threaded rod 206 with corresponding polygonal edges. These corresponding edges may facilitate the connector gripping and rotating the medial threaded rod 404. In some embodiments the motor assembly 200 may be a power drill, a battery operated drill, or an electric drill with power cord.

Furthermore, attached to a front surface of the upper crossbar 202 may be a rod stabilizer 403. The rod stabilizer 403 may surround the medial threaded rod 206 and may include interior threading allowing the medial threaded rod 206 to rotate therein while being supported and stabilized.

The seat assembly 208 may be attached to the medial threaded rod 206 via a threaded slide coupler 405. The threaded slide coupler 405 may also surround the medial threaded rod 206 and may include internal threading allowing it to ascend and descend within the outer frame 103 via the medial threaded rod 206 depending on the rotation direction of the medial threaded rod 404. Furthermore, the threaded slide coupler 405 may be fixedly attached to the seat back 407 of the seat assembly 108 causing the seat assembly 108 to ascend and descend along with the slide coupler 405 depending on the rotation direction of the medial threaded rod 404. By way of non-limiting example, a clockwise rotation of the medial threaded rod 206 may cause for the threaded slide coupler 405 and seat assembly 108 to descend and a counterclockwise rotation of the medial threaded rod 206 may cause for them to ascend. There may be a switch on the motor assembly 200 allowing it to transition from a clockwise rotation to a counterclockwise rotation.

The seat back 407 may extend from an L-Brace 208 on one side of the apparatus 100 to an L-Brace 208 on an opposing side of the apparatus 100. The seat back may be fixedly attached to the L-Braces 208 at each longitudinal end 415 of the seat back 407 via seat back connectors 408. In some embodiments, the longitudinal end 415 of the seat back 407 may include removed corners forming notches that may allow for block slide connectors 409 to bolt the L-Braces 208 to blocks at their rear. Furthermore, in some embodiments, the notches may allow for the seat back 407 to fit more securely onto the L-Braces 208 as the edges of the notches may abut the block slide connectors 409 giving more secured leverage to the seat back 407. A seat assembly support bar 410 may also extend from one L-Brace 208 to an opposing L-Brace 208. Furthermore, as shown by FIG. 4, the entire seat assembly 108 is ascending 406 due to the rotation of the medial threaded rod 404.

Figure 5:
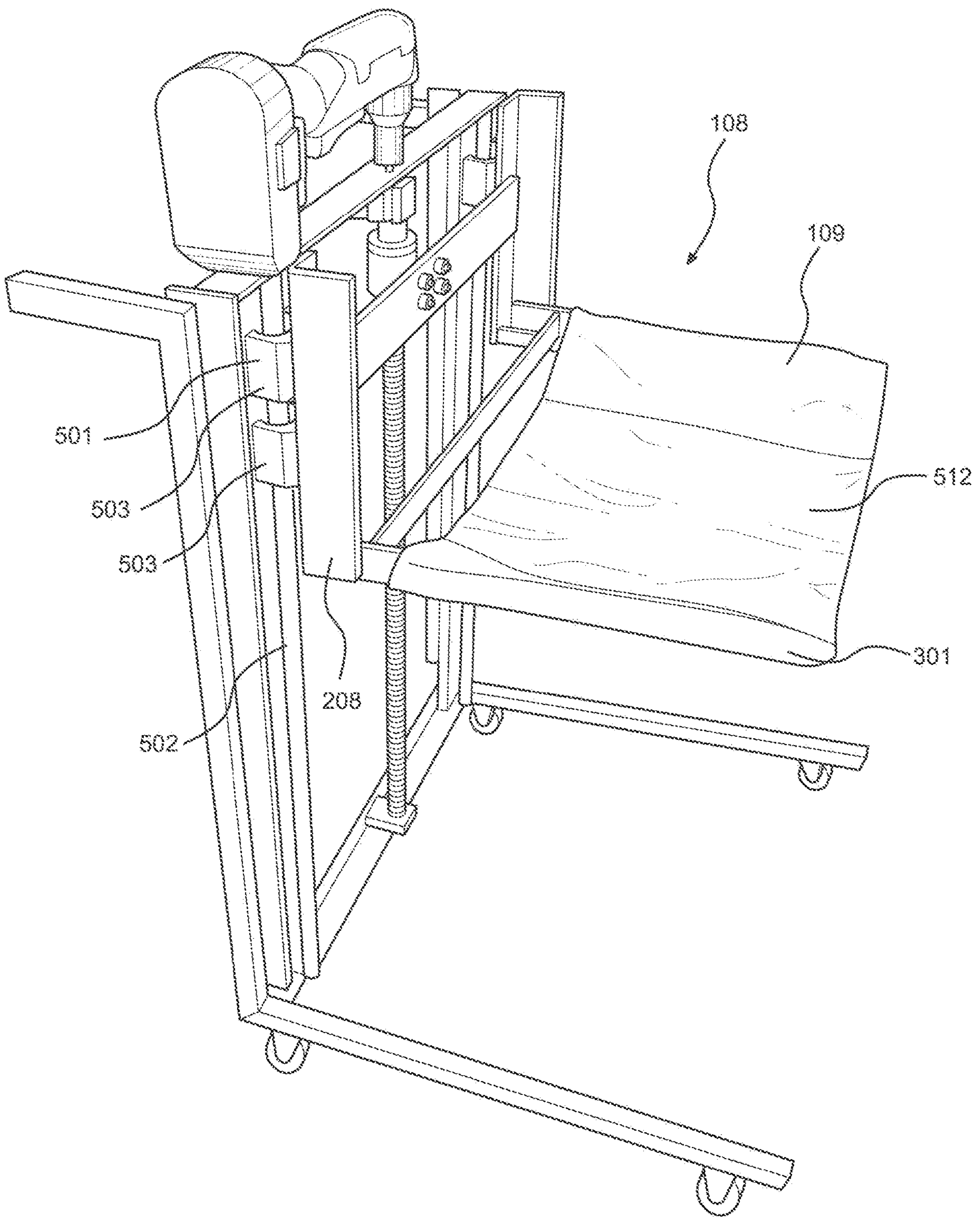
FIG. 5 is a front perspective view of the personal lifting apparatus in a second position according to the embodiment of the invention illustrated in FIG. 1.

FIG. 5 is a perspective side view of the apparatus 100 illustrating additional componentry thereof. As shown, the apparatus 100 may include a slider 501 on either side 104 to facilitate the seat assembly 108 ascending and descending the apparatus 100. Each slider 501 may be fixedly attached to a respective L-Brace 208. Furthermore, each slider 501 may be comprised of a pair of slider blocks 503 surrounding a respective slider bar 502. The slider bars 502 may be vertically oriented along an inner portion of the inner frame 204 within the tracks 205. The slider bars 502 may be structured to allow the slider blocks 503 to easily slide up and down the slider bars 502 with minimal friction while providing a securing means for the seat assembly 108.

Also illustrated is the seat assembly 108 in a second position 512. The second position 512 may be an elevated orientation of the seat assembly 108 located at an upper portion of the apparatus 100. As a result, the sliders 501 may be positioned at their uppermost orientation with respect to the slider bars 502. The seat assembly side foundations 301 along with the pliable seat 109 are also elevated to facilitate the ability of a user seated thereon to easily transfer themselves to a standing position.

Figure 6:
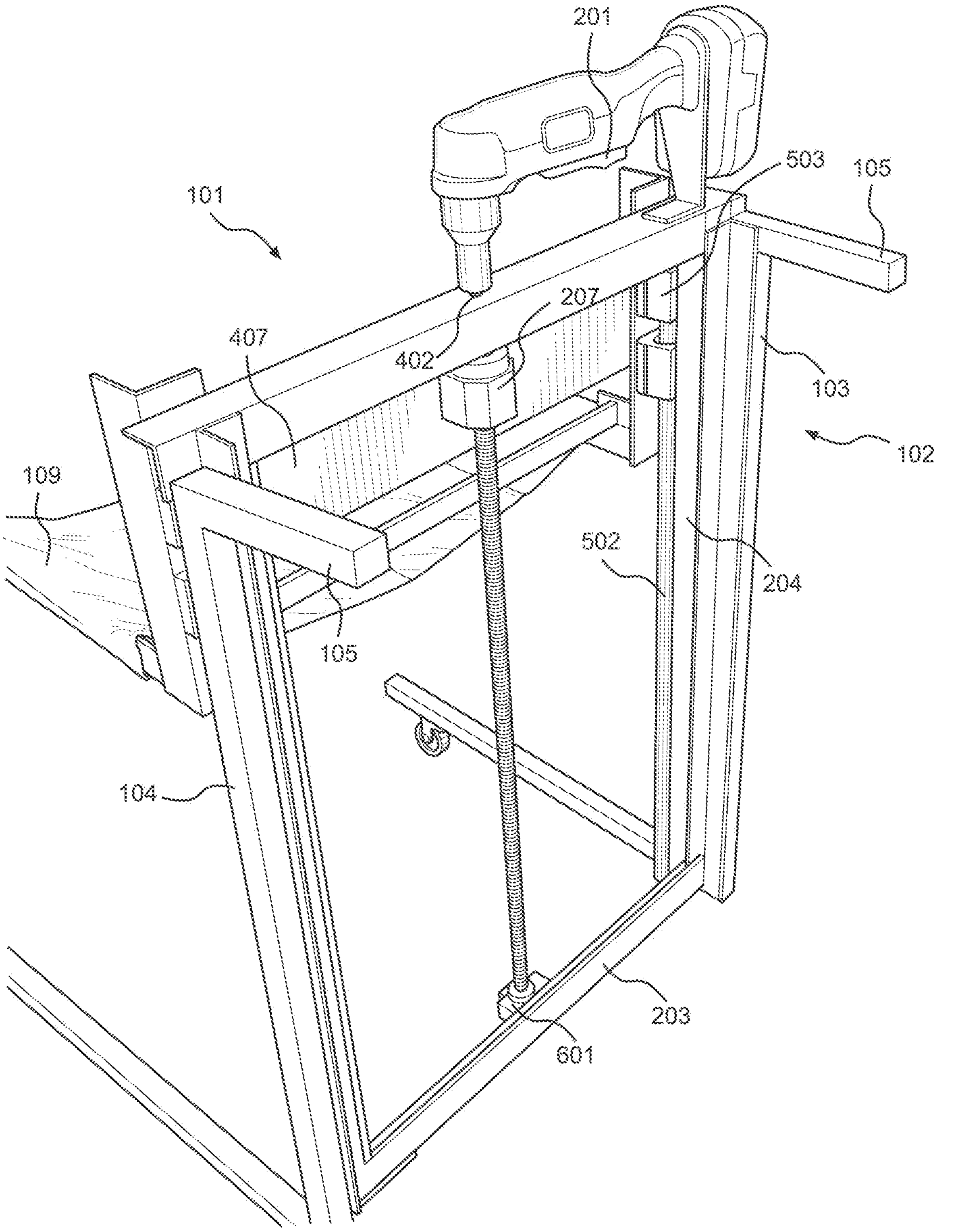
FIG. 6 is a back perspective view of the personal lifting apparatus according to the embodiment of the invention illustrated in FIG. 1.

FIG. 6 illustrates the apparatus back 102 and takes a closer look at some of the componentry. More clearly shown are the upper handles 105, the outer frame 103, the inner frame 204, the slider blocks 503 and slider bar 502, the threaded slide coupler 207, and the apparatus side 104. Also shown is a threaded rod lower brace 601 that may be fixedly attached to the lower crossbar 203. The threaded rod lower brace 601 may house the terminating end of the medial threaded rod 206 and may allow for it to spin while also holding it in place at the bottom of the apparatus 100.

Figure 7:
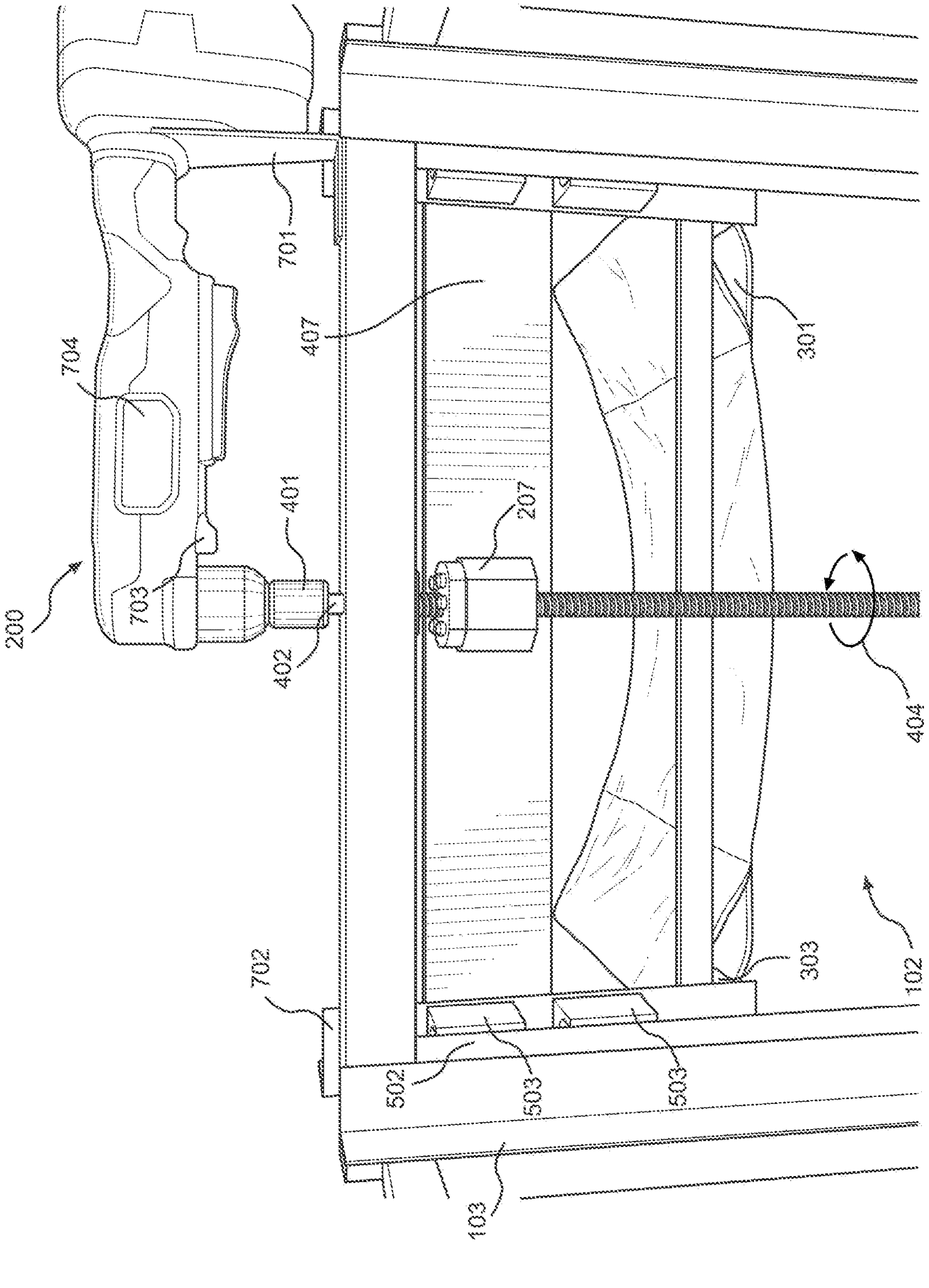
FIG. 7 is a back perspective view of an upper portion of the personal lifting apparatus according to the embodiment of the invention illustrated in FIG. 1.
Figure 8:
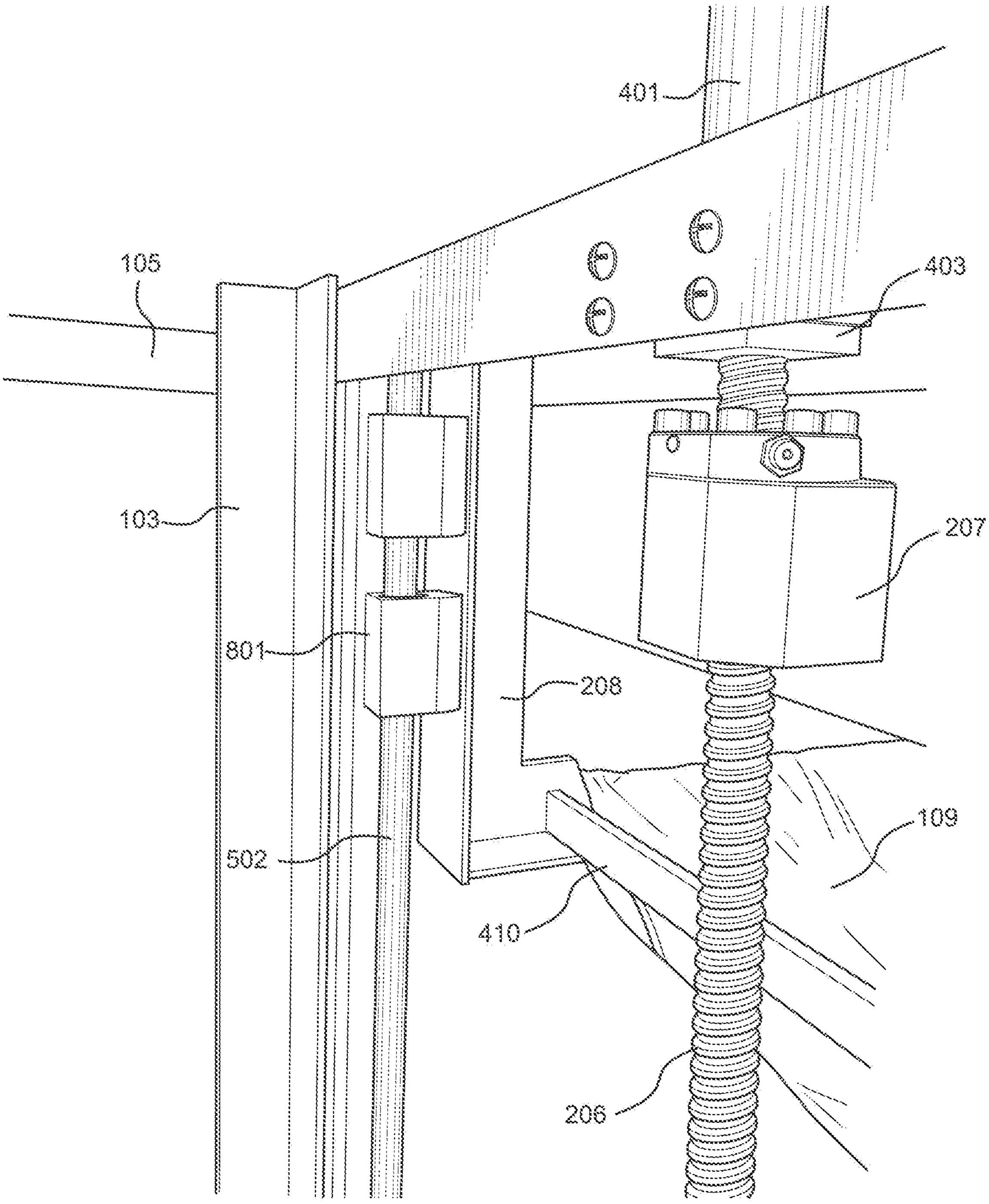
FIG. 8 is a back perspective view of componentry of the personal lifting apparatus according to the embodiment of the invention illustrated in FIG. 1.

FIGS. 7 and 8 show the apparatus back 102 and highlight some additional features of the componentry. The motor assembly 200 may include a directional control 703 that may determine the spin direction of the medial threaded rod 206 when switched. Furthermore, the attachment member 401 and the connector 402 are more clearly shown. Also shown is a motor mount 701, which may support the base portion of the motor assembly 200 at one side of the upper crossbar 202. The motor mount 701 may be an L-shaped brace on the top of the upper crossbar 202 with a U-shaped receiving notch at one end to hold that end of the motor assembly 200. The motor assembly may be secured into place at the other end via the attachment member 401 and connector 402 securing to the medial threaded rod 206 through the upper crossbar 202.

Also shown are the slider blocks 503 attached to the slider bar 503 on the outer frame 103. In some embodiments the slider blocks 503 may be U-shaped blocks and may have one side curl around each respective slider bar 503. In other embodiments, the slider blocks 503 may completely encircle the slider bar 801. The figure also demonstrates how the threaded slide coupler 207 may be mounted to the rear of the seat back 407. It further gives a good view of the seat assembly side foundations 301 fitted into the side sleeves 301.

Figure 9:
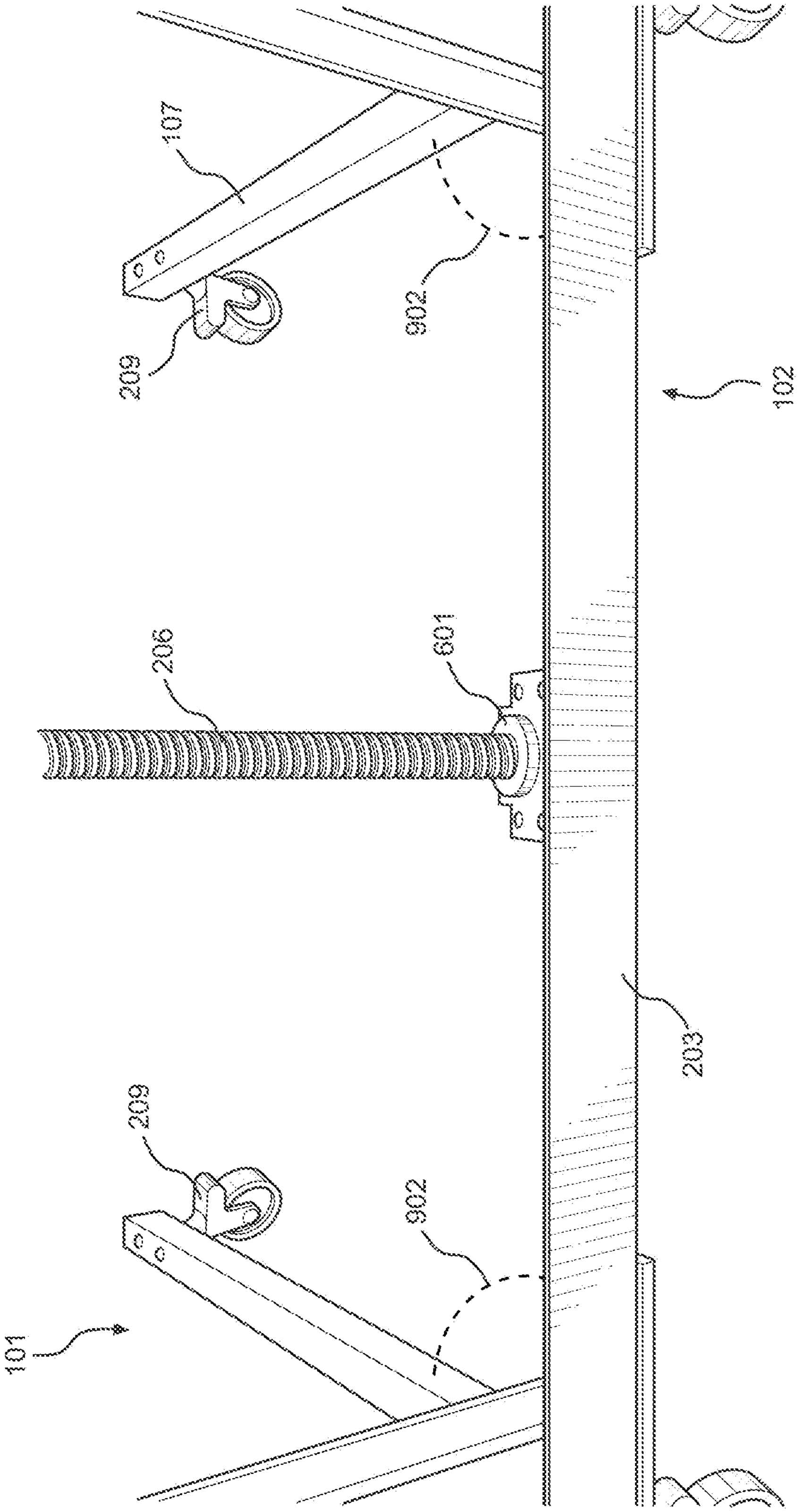
FIG. 9 is a front bottom view of the personal lifting apparatus according to the embodiment of the invention illustrated in FIG. 1.

FIG. 9 shows a lower portion of the apparatus 100 from the back 102 and gives a clearer look at the lower features. In particular, the obtuse attachment angle 902 of the foundation bar 107 with respect to the lower crossbar 203 is shown. This obtuse attachment angle 902 may allow for the seat assembly 108 to fully descend to the ground without interference from the outer frame 103 and the foundation bars 107. Further emphasized is that the wheels 209 below the apparatus 100 on the foundation bars 107 may be multidirectional for ease of maneuvering.

Figure 10:
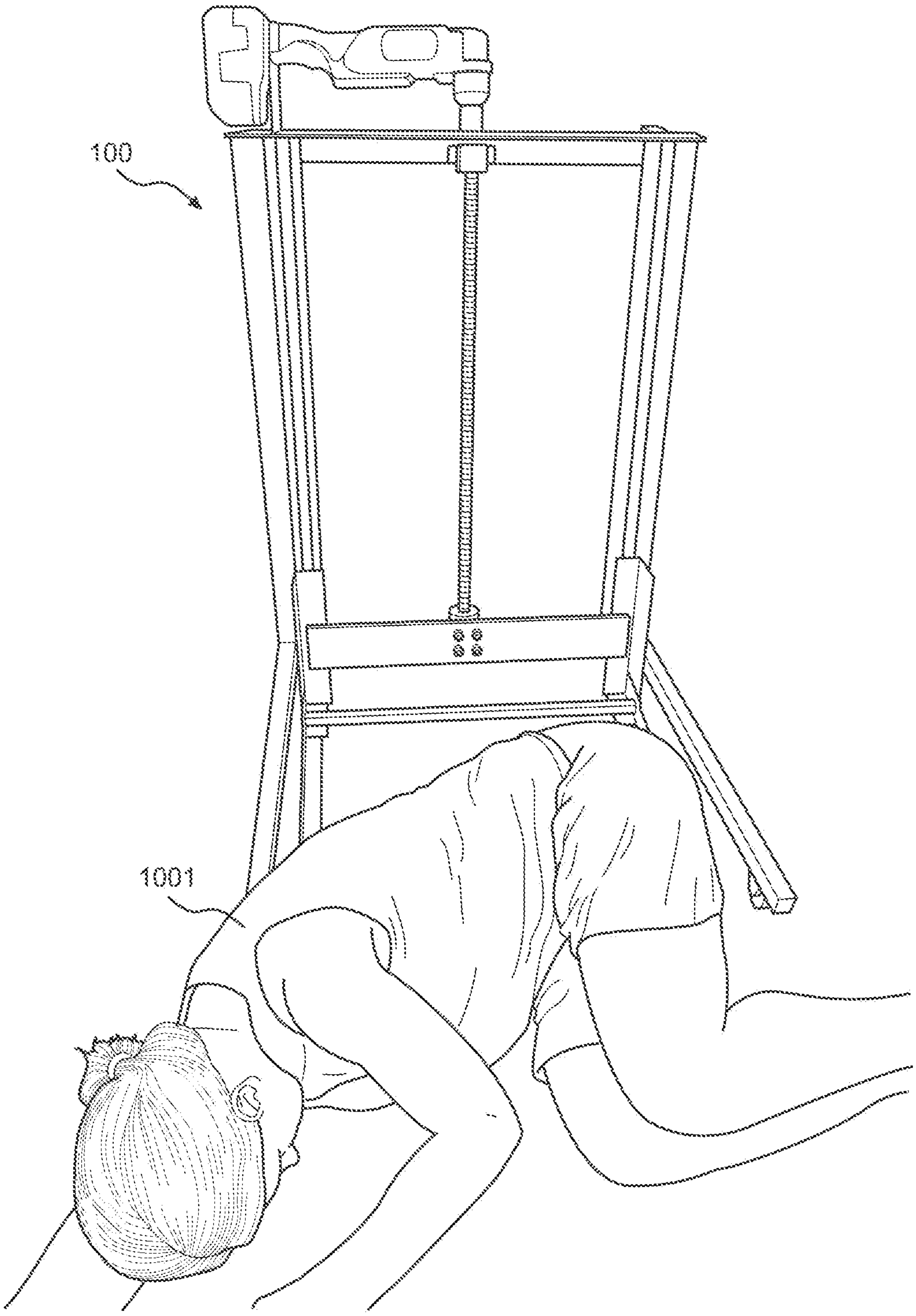
FIG. 10 is a front environmental view of the personal lifting apparatus according to the embodiment of the invention illustrated in FIG. 1.

FIGS. 10 through 14 demonstrate how the apparatus 100 may be used. FIG. 10 illustrates a scenario where an elderly woman has fallen to the floor and requires assistance to be brought to her feet. In this case, she is a beneficiary user 1001 of the apparatus 100, which has been wheeled behind her after her fall.

Figure 11:
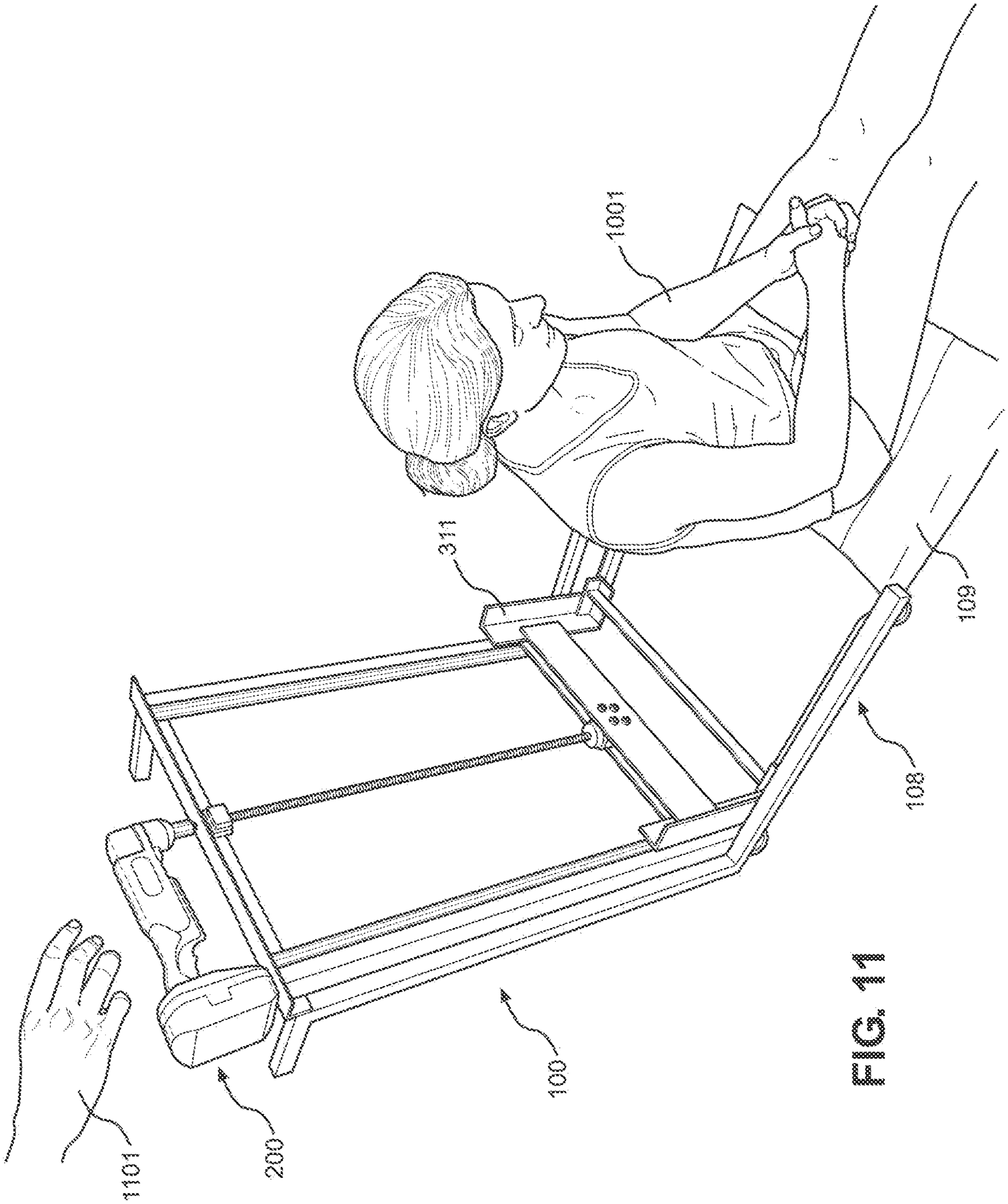
FIG. 11 is a side perspective environmental view of the personal lifting apparatus according to the embodiment of the invention illustrated in FIG. 1.

FIG. 11 illustrates how the pliable seat 109 has been removed from the seat assembly 108 and positioned on the ground underneath the beneficiary user 1001 who is now in a seated position on top of the pliable seat 109. An actuating user 1101 has utilized the motor assembly 200 to make the seat assembly align with the floor at ground level in a first position 311.

Figure 12:
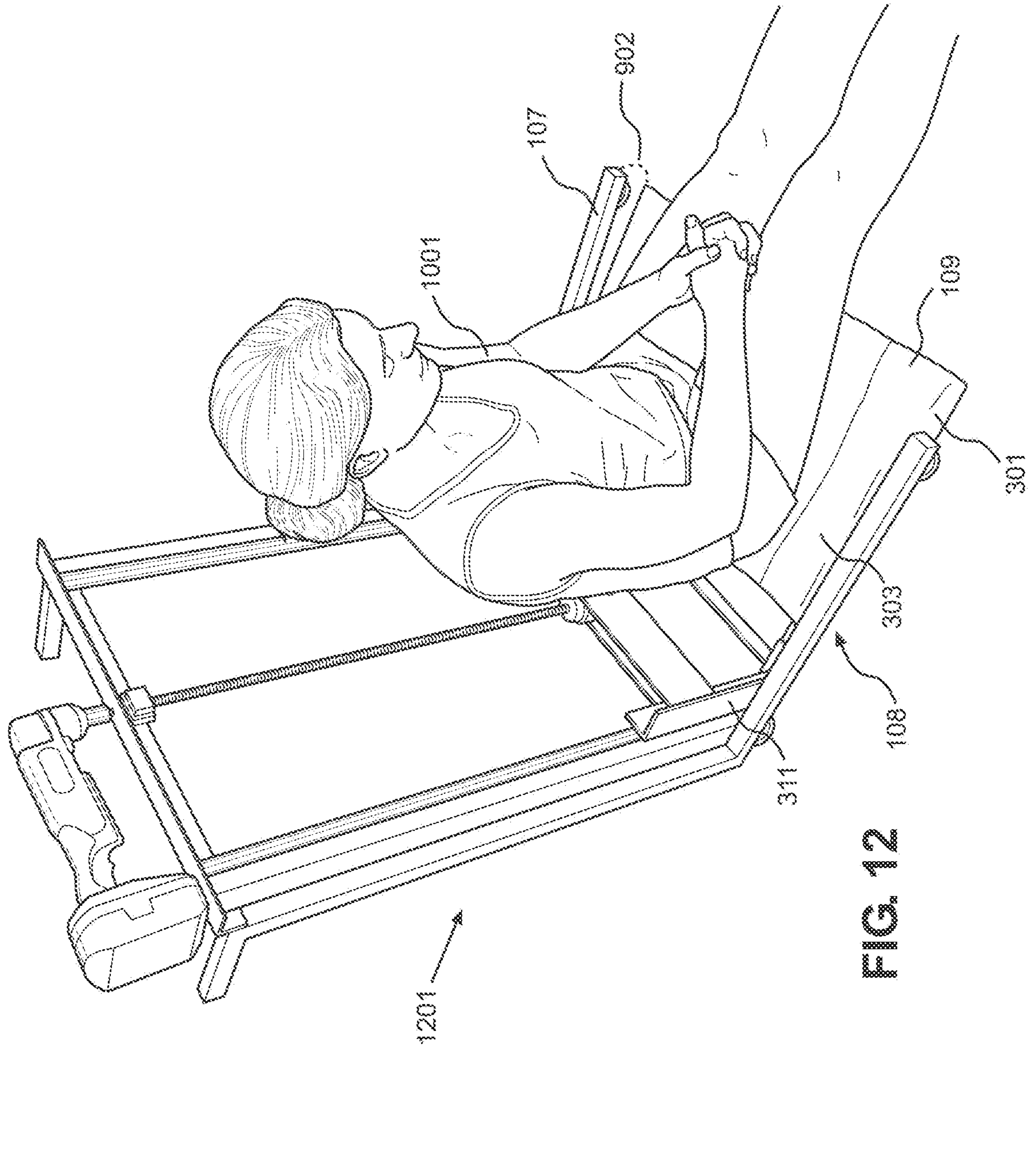
FIG. 12 is a front perspective environmental view of the personal lifting apparatus according to the embodiment of the invention illustrated in FIG. 1.

FIG. 12 shows that the apparatus is then moved 1201 toward the beneficiary user 1001 from behind and the seat assembly side foundations 303 have been positioned into the side sleeves 301. The foundation bars 107 are on either side of the beneficiary user 1001 with plenty of room for her to sit due to the wide attachment angle 902 of the foundation bars 107 with respect to the seat assembly side foundations 303 forming her seat. The beneficiary user 1001 is now in a seated position, on the pliable seat 109 attached to the seat assembly 108 in a first position 311 and she is ready to be lifted.

Figure 13:
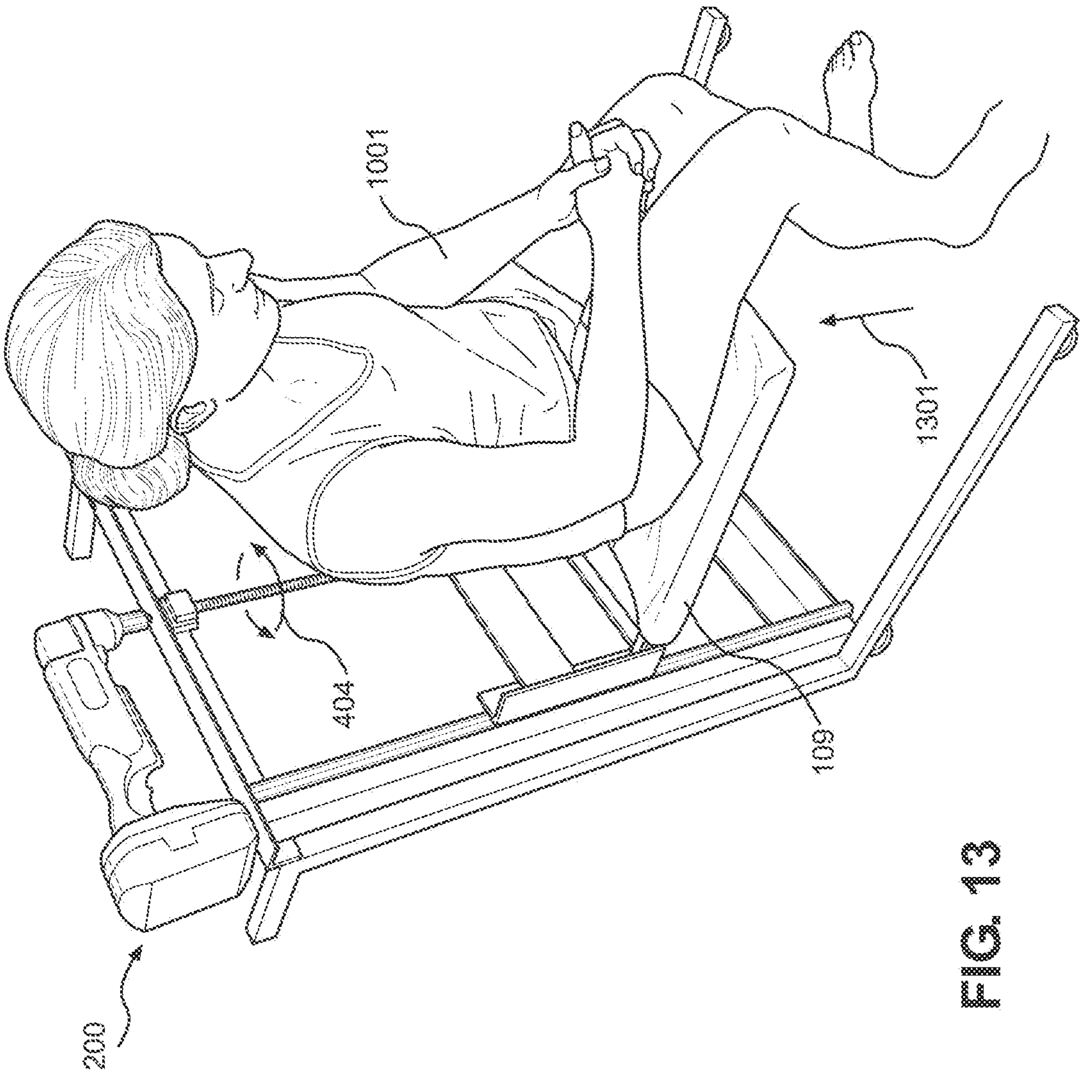
FIG. 13 is a front perspective environmental view of the personal lifting apparatus according to the embodiment of the invention illustrated in FIG. 1.

FIG. 13 depicts the beneficiary user 1001 sitting on the pliable seat 109 with the seat assembly ascending 1301. An actuating user 1101 has initiated the motor within the motor assembly 200. This action rotates the medial threaded rod 404 causing the seat assembly 208 with the beneficiary user 1001 seated thereon to ascend while she is in the seated position.

Figure 14:
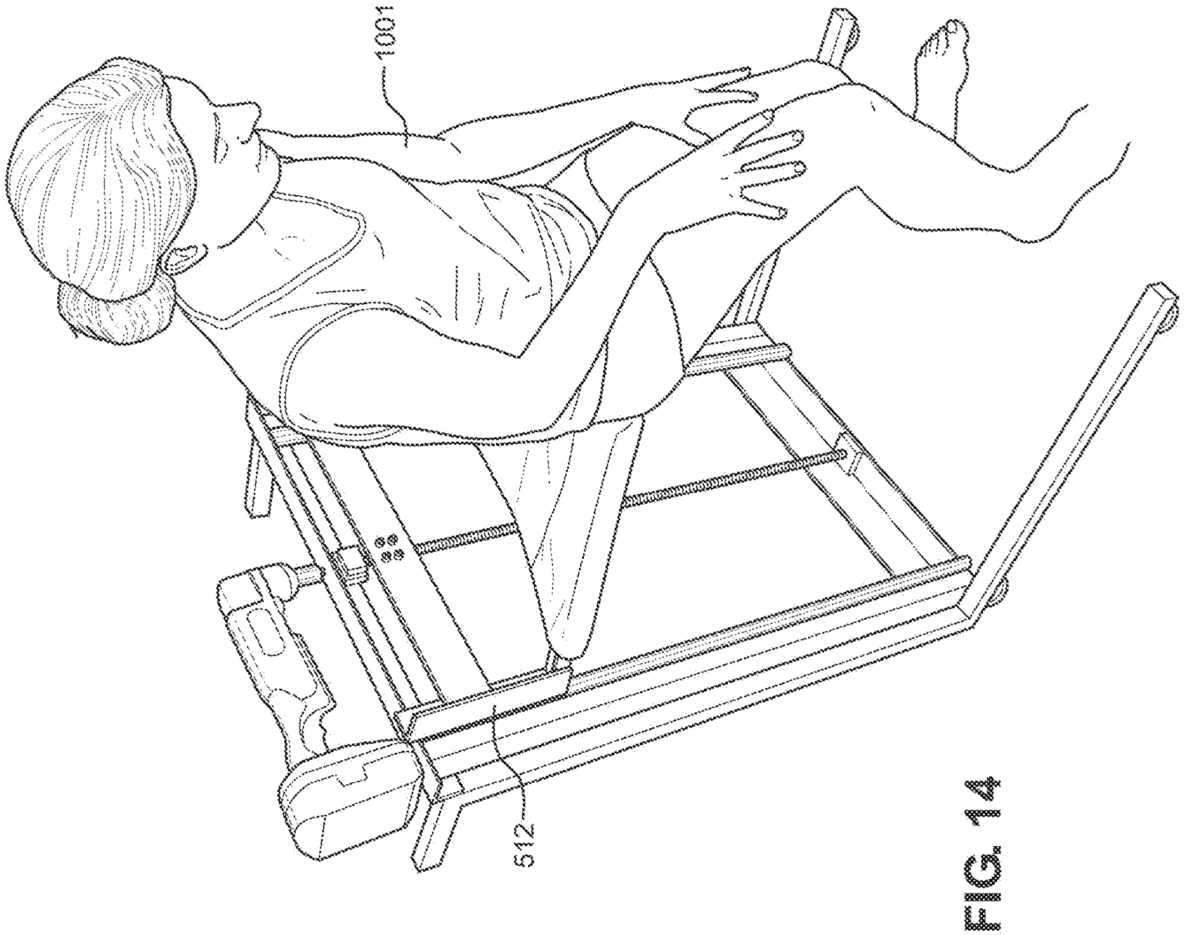
FIG. 14 is a front perspective environmental view of the personal lifting apparatus according to the embodiment of the invention illustrated in FIG. 1.

FIG. 14 illustrates the seat assembly 108 ascended to a second position 512. The beneficiary user 1001 has now been brought to a height where she is able to dismount into a standing position.

Figure 15:
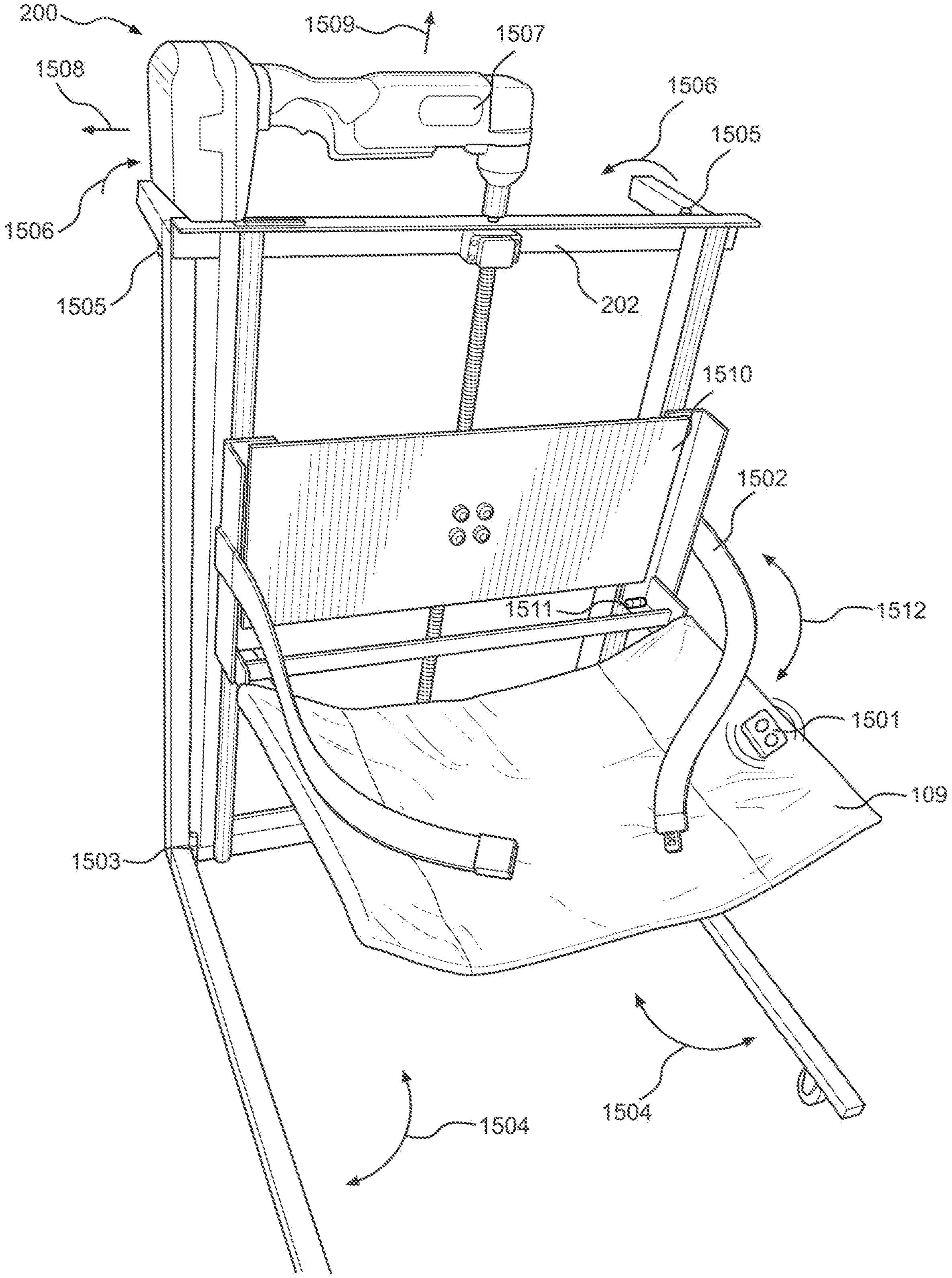
FIG. 15 is a front perspective view of the personal lifting apparatus according to another embodiment of the invention.

FIG. 15 shows another embodiment of the apparatus 100 whereby additional features may be included. Beginning at the top, the motor assembly 200 may include several features. One feature is that it may be removable 1509 from the apparatus 100 for maintenance, repair, and replacement. This may occur by lifting the motor assembly 200 off of the motor mount 701 at one end and unscrewing the attachment member 401 and/or the connector 402 at the other end. Furthermore, components of the motor assembly 200 such as the battery 1508 may be removable from the motor assembly 200 for recharging, maintenance, repair, and replacement. In other embodiments, the battery 1508 may be replaced or supplemented with a power cord.

Additionally, in some embodiments, the motor assembly 200 may have a communication module 1509 including a receiver structured to receive instructions from a remote control 1501 to actuate its motor when commanded. The remote control 1501 may be programed to actuate the motor assembly 200 allowing the seat assembly 108 to be ascended and descended by the beneficiary user 1001 rather than another person. In some embodiments, the remote control 1501 may be operable to navigate the apparatus 100 to find the beneficiary user 1001 either through manual control or having the remote control 1501 act as a homing device whereby the apparatus 100 follows signals to autonomously travel to the beneficiary user 1001. By way of non-limiting example, the remote control 1501 may be embedded in the pliable seat 109 or a seat belt 1502. It may also be removably engaged with either, or may simply be an unattached remote accompanying the apparatus 100.

Other features of the apparatus 100 may include a plurality of hinges designed to facilitate storage of the apparatus 100. A pair of upper handle hinges 1505 may be positioned at the intersection between the upper handles 105 and the upper crossbar 202 enabling the upper handles to fold inward 1506 to the upper crossbar 202 or in some embodiments the hinges may allow for the upper handles 105 to fold vertically toward the outer vertical supports 106. A pair of seat assembly hinges 1511 may be positioned where the L-Braces 208 juncture with the seat assembly side foundations 303 enabling the seat to collapse into a closed position against the L-Braces 208 and lower crossbar 203 or extend into an open position for seating. In other words, the seat assembly 108 may be structured to rest perpendicularly to the seat back 407,1510 when in the open position and parallel with the seat back 407,1510 when in the closed position. Furthermore, there may be base hinges 1503 at the base of the foundation bars 107 allowing the foundation bars 107 to be collapsed inward toward the inner and outer frames 204, 103 either vertically toward the outer vertical support 106 or horizontally toward the lower crossbar 203.

Additionally, the seat assembly 108 may include a full backed seat 1510 extending the entire upper portion of the L-Braces 208 to provide support for a beneficiary user 1001. As previously mentioned, the seat assembly 108 may also include a seat belt 1502 extending from either side of the L-Braces 208 providing a means to secure a beneficiary user 1001 safely into the seat assembly 108.

That which is claimed is:

1. A personal lifting apparatus comprising:
- an outer frame comprising a pair of opposing sides, each side including an upper handle, outer vertical support, and a foundation bar;
- an upper crossbar and a lower crossbar extending from one side and connecting to the opposing side;
- a motor assembly situated atop the upper crossbar;
- a threaded rod extending from the upper crossbar to the lower crossbar;
- an inner frame;
- a pair of tracks attached to the inner frame;
- a seat assembly attached to the pair of tracks;
- a threaded slide coupler fixedly attached to the seat assembly;
- a pliable seat;
- wherein the seat assembly comprises a pair of opposing side L-Braces:
- wherein the seat assembly is configured to ascend and descend within the outer frame via the slide coupler; and
- wherein the seat assembly is configured to align with the floor in a first position and lift to a second position.

2. The personal lifting apparatus of claim 1 wherein each foundation bar is configured to extend distally from the outer vertical support and include a pair of wheels proximate each opposing end.

3. The personal lifting apparatus of claim 1 wherein the inner frame comprises a pair of inner vertical supports attached to the outer vertical supports; and wherein the pair of tracks are attached to the inner vertical supports.

4. The personal lifting apparatus of claim 1 wherein the seat assembly L-Braces are attached to sliders positioned within the pair of tracks.

5. The personal lifting apparatus of claim 1 wherein the sliders are comprised of a pair of blocks on opposing sides of the inner frame configured to ascend and descend slider bars positioned on the sides.

6. The personal lifting apparatus of claim 1 wherein the motor assembly rotates the threaded rod causing the threaded slide coupler fixedly attached to the seat assembly to ascend and descend.

7. The personal lifting apparatus of claim 1 wherein the motor assembly comprises a grip configured to actuate its motor when squeezed.

8. The personal lifting apparatus of claim 1 wherein the motor within the motor assembly may be actuated via remote.

9. The personal lifting apparatus of claim 1 wherein the motor assembly connects to the threaded rod through the upper crossbar.

10. The personal lifting apparatus of claim 1 wherein the motor assembly comprises a removable and rechargeable battery.

11. A personal lifting apparatus comprising:
- a front and a back;
- an outer frame comprising:
  - a pair of opposing sides, each side including an upper handle, outer vertical support, and a foundation bar;

each foundation bar configured to extend distally from the outer vertical support and including a pair of wheels proximate each opposing end;
an upper crossbar and a lower crossbar extending from one side and connecting to the opposing side;
a motor assembly situated atop the upper crossbar;
a threaded rod extending from the upper crossbar to the lower crossbar;
an inner frame comprising a pair of inner vertical supports attached to the outer vertical supports;
a pair of tracks attached to the pair of inner vertical supports at the apparatus front;
a seat assembly comprising a pair of opposing side L-Braces attached to sliders positioned within the pair of tracks;
a seat back extending from one side L-Brace vertical member to another;
a threaded slide coupler fixedly attached to the seat back;
a pliable seat configured to slidably engage each side L-Brace and extend from one side of the seat assembly to the other;
wherein the seat assembly is configured to ascend and descend via the slide coupler and within the outer frame when the motor assembly rotates the threaded rod.

12. The personal lifting apparatus of claim 11 wherein each foundation bar further comprises an attachment angle extending from the outer vertical support configured to create a wider opening at the front.

13. The personal lifting apparatus of claim 11 wherein the motor assembly comprises a removable and rechargeable battery.

14. The personal lifting apparatus of claim 11 wherein the pliable seat is comprised of at least one of fabric and synthetic fabric.

15. The personal lifting apparatus of claim 11 wherein the seat assembly further includes at least one of a seat belt and seat back.

16. The personal lifting apparatus of claim 11 wherein the seat assembly is configured to rest perpendicularly when in the open position and parallel with the seat back when in the closed position.

17. The personal lifting apparatus of claim 11 wherein the foundation bars are configured to rotate and align with at least one of the lower crossbar and outer frame for storage.

18. The personal lifting apparatus of claim 11 wherein the handles are configured to rotate and align with the upper crossbar for storage.

19. The personal lifting apparatus of claim 11 wherein the motor assembly comprises a grip configured to actuate its motor when squeezed.

20. A personal lifting apparatus comprising:
a front and a back;
an outer frame comprising:
a pair of opposing sides, each side including an upper handle, outer vertical support, and a foundation bar;
each foundation bar configured to extend distally from the outer vertical support and including a pair of wheels proximate each opposing end;
an upper crossbar and a lower crossbar extending from one side and connecting to the opposing side;
a motor assembly situated atop the upper crossbar;
a threaded rod extending from the upper crossbar to the lower crossbar;
an inner frame comprising a pair of inner vertical supports attached to the outer vertical supports;
a pair of tracks attached to the pair of inner vertical supports at the apparatus front;
a seat assembly comprising a pair of opposing side L-Braces attached to sliders positioned within the pair of tracks;
a seat back extending from one side L-Brace vertical member to another;
a threaded slide coupler fixedly attached to the seat back;
a pliable seat configured to slidably engage each side L-Brace and extend from one side of the seat assembly to the other;
wherein the seat is comprised of at least one of fabric and synthetic fabric;
wherein the seat assembly includes at least one of a seat belt and seat back;
wherein the seat assembly is configured to rest perpendicularly when in the open position and parallel with the seat back when in the closed position;
wherein the foundation bars are configured to rotate and align with the outer frame for storage;
wherein the handles are configured to rotate and align with the outer frame for storage;
wherein the seat assembly is configured to align with the floor in a first position and is operable to fit underneath a user before lifting the user to a second position; and
wherein the seat assembly is configured to ascend and descend within the outer frame when the motor assembly rotates the threaded rod.

* * * * *